(12) United States Patent
Ahmed

(10) Patent No.: US 6,813,634 B1
(45) Date of Patent: Nov. 2, 2004

(54) NETWORK FAULT ALERTING SYSTEM AND METHOD

(75) Inventor: Mohammad Ahmed, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/497,572

(22) Filed: Feb. 3, 2000

(51) Int. Cl.[7] .................................... G06F 15/173
(52) U.S. Cl. ..................... 709/224; 709/202; 709/223; 714/39; 714/43; 714/47
(58) Field of Search .................. 709/202, 223, 709/224, 231, 318; 714/43, 39, 47

(56) References Cited

U.S. PATENT DOCUMENTS

| | | | | |
|---|---|---|---|---|
| 5,751,964 A | * | 5/1998 | Ordanic et al. | 709/224 |
| 5,948,055 A | * | 9/1999 | Pulsipher et al. | 709/202 |
| 5,964,837 A | * | 10/1999 | Chao et al. | 709/224 |
| 6,012,095 A | * | 1/2000 | Thompson et al. | 709/231 |
| 6,052,722 A | * | 4/2000 | Taghadoss | 709/223 |
| 6,061,723 A | * | 5/2000 | Walker et al. | 709/224 |
| 6,085,243 A | * | 7/2000 | Fletcher et al. | 709/224 |
| 6,182,157 B1 | * | 1/2001 | Schlener et al. | 709/318 |
| 6,272,537 B1 | * | 8/2001 | Kekic et al. | 709/223 |
| 6,279,034 B1 | * | 8/2001 | Jarriel et al. | 709/223 |
| 6,336,139 B1 | * | 1/2002 | Feridun et al. | 709/224 |
| 6,564,341 B1 | * | 5/2003 | Sundaram et al. | 714/43 |
| 6,571,285 B1 | * | 5/2003 | Groath et al. | 709/223 |

OTHER PUBLICATIONS 5,675,724, Oct. 7, 1997, Beal, et al, "Knowledge Based Resource Management", 24 pages.
5,983,364, Nov. 9, 1999, Bortcosh, et al, System and Method for Diagnosing Computer Faults, 18 pages.

* cited by examiner

*Primary Examiner*—Patrice Winder
*Assistant Examiner*—ThuHa Nguyen
(74) *Attorney, Agent, or Firm*—Robert H. Frantz; David A. Mims, Jr.

(57) ABSTRACT

An enhancement to computer network maintenance technology which reduces redundant and inaccurate fault reporting and alerting based upon implementation of logic which determines the most likely single point of failure. In modern computer and telephone networks, certain single points of failure result in the false appearance of multiple failures. However, by analyzing the pattern of apparent failures in view of the known network topology, a single point of failure can be determined as the root cause of the multiple failure indications. An enhancement to the currently-available network maintenance technology, including software applications executing on network server platforms, provides this fault determination logic, filters spurious and incorrect failure reports, and posts failure reports only for the single point failure.

24 Claims, 6 Drawing Sheets

*Prior Art*

NETWORK FAULT ALERTING SYSTEM AND METHOD

BACKGROUND OF THE INVENTION

1. Field of the Invention

This invention pertains to the arts of computer network management, and especially to the management of network bandwidth consumed by network management, status, and maintenance messages. More particularly, this invention relates to the arts of intelligent processing and diagnosis of network failures and problems based on fault analysis logic to more accurately detect and isolate computer network problems, to minimize the network bandwidth consumed by maintenance messages, and to effectively notify maintenance personnel of the most likely point of failure.

2. Description of the Related Art

Computer networks, such as local area networks ("LAN"), wide-area networks ("WAN"), intranets and the Internet typically include substantial maintenance and monitoring capabilities. Modern telephone networks, such as Signalling System 7 ("SS7"), Integrated Services Data Network ("ISDN"), and many digital cellular networks including GSM, also include substantial equipment and software which are dedicated to the provisioning, monitoring and maintenance of the network and its equipment. All of the above named networks are packet-based networks, and are well-known within their respective arts.

Key to the architecture and operation of these networks are packet routers, which interconnect multiple physical networks and provide routing and forwarding of packets, or "messages", from one network to another based upon addressing schemes defined by well-known protocols such as the Internet Protocol ("IP") or LAPD for SS7 and ISDN. These addressing schemes can be generalized as schemes which define each data packet or message has having a header, payload, and tail. The destination address, origination address, packet sequence number, and payload size are typically included in the header section of the message. The payload section contains the actual computer data which is being transferred from one computer to another via the computer network, which may represent a portion of a computer file, a formatted message, or a section of digitized signal such as voice, video or other audio. The various message formats are defined by well-known standards promulgated by InterNIC, the International Telecommunications Union, Bellcore, and ANSI.

In order to manage these networks, including monitoring of network operation status, configuring and re-configuring network elements (routers, terminals and switches), and provisioning of new network sections, a number of well-known software and hardware products have been developed and placed on the market. Most of these products integrate specialized software onto network server platforms. The software uses the network connectivity and bandwidth provided by the network server platform to perform maintenance testing, messaging, status checking, and alert messaging. Many times, the actual network being used for "real" traffic, such as computer file transmission or telephone call transmission, is used for the maintenance communications as well. In this case, the maintenance messages "mix in" with the bandwidth of the "real" traffic. As such, if maintenance messages accumulate to significant bandwidth consumption, network performance may be adversely affected. In other cases, separate networks dedicated to maintenance may be configured to avoid this problem. But, even so, if maintenance messages exceed an expected bandwidth level, the dedicated maintenance network may fail.

When network management software like Netview/6000 or Hewlett-Packard's OpenView and others, detects a network device such as a router has gone off-line, it will send "node down" events or messages for all the workstations connected downstream from off-line router to network problem management server. The network problem management server provides correlation and processing for opening trouble tickets, and eventually, it send alerts to appropriate maintenance personnel thru pagers, e-mail, and/or telephone calls.

FIG. 1 shows the topology of prior art maintenance systems. A router (1) may have multiple ports to multiple networks. Each port is serviced by a network interface card ("NIC"), such as an Ethernet LAN interface card. FIG. 1 shows an example of a router serving three networks, A, B, and C, each of which is a group of networked computer workstations or personal computers. For example, network A (5) has several "drops" to computers, and one drop or connection (6) to the router. Likewise, network B (4) is connected (3) to the router, and network C (2) is connected (7) to the router. Packets or messages received by the router are forwarded to other networks based on the addressing scheme of the network, such as IP in the case of many computer networks.

Also shown in FIG. 1 is a connection (8) to a maintenance server (9) such as a NetView 6000 server. In this example, this connection (8) connects to the router (1) using the router's NIC for network D. The maintenance server (9) typically contains a connectivity database which contains all of the network addresses of all the elements on the other networks connected to the router, such as all the computers connected to networks A, B, and C. Using this database, the maintenance server (8) periodically sends status query messages, or "pings", to each of the computers. If each computer is on-line, the router is functioning properly, and the network physical media (cable, RF links, etc.) is in tact, a reply will be received from each computer nearly immediately in response to the "ping". If a reply or response is not received within a certain time from transmitting of the "ping", the maintenance server (9) may assume a problem with the computer, router, or network(s) exists.

For example, if all computers and the router are functioning correctly except for one computer, then only one response will not be received, and all other responses will be received. However, if the router fails, no responses will be received from any of the computers. In the most basic of maintenance system configurations such as the basic Net-View 6000 product, this scenario can result in a storm of events being sent to the problem management server which correlates events and opens trouble tickets, leading to many useless and/or redundant e-mails and pagers.

FIG. 2 illustrates this scenario. A normal "ping" (20) is forwarded from the NetView 6000 to the router, which forwards (21) it to the appropriate PC. The PC, if functioning properly, replies (22) via the router to the NetView 6000 (23) within a predetermined time limit $t_1$. If the router has failed, the "ping" (24) will not be replied to by any of the computers within time $t_1$, which will result in the NetView 6000 sending multiple "computer down" messages (25) to the problem management server. The problem management server is configured to wait a period of time $t_3$ before escalating the event to notification of the maintenance personnel, in order to reduce the number of alerts made for temporary problems such as power glitches, computer reboots, etc. But, if no "computer up" messages are received within time limit $t_3$, the problem management server will send multiple pager messages and telephone calls, and may open multiple trouble tickets (26), as many as one per computer on the network. This results the in the alerting of the maintenance personnel, but is confusing to the personnel as to which element is actually failed, Additionally, the network link between the NetView 6000 server and the problem management server has suffered unnecessary bandwidth consumption by all of the "computer down" messages.

In an enhancement of the prior art network management technology, a product called Tivoli for Network Connectivity module (TFNC) by International Business Machines ("IBM") employs similar concept, but it adds some intelligent processing to the maintenance server. With TFNC, all of the original "computer down" messages will be sent to the problem management server, but, as shown in FIG. 3, the Tivoli processing (30) will examine the network topology and determine that all of these failures are likely due to a single point failure, namely a router failure. So, within the escalation time period $t_3$, TFNC will send multiple "computer up" messages (31) to the problem management server, which results in a net status of only the "router down" message being escalated by the problem management server. While this enhancement to the network maintenance technology produces a desirable reduction in the number of alerts (pager messages, trouble tickets, etc.) (32) issued to maintenance personnel, it does not reduce the bandwidth consumed by the messages on the network between the maintenance server (TFNC and NetView 6000). Rather, it nearly doubles the bandwidth consumption.

Therefore, there is a need in the art for a system and method which intelligently processing the "ping" response pattern in a timely manner, and which issues a minimal number of "network element down" messages which precisely isolate the most likely point of failure in order to minimize network bandwidth consumption, and to minimize redundant and incorrect maintenance alerts.

BRIEF DESCRIPTION OF THE DRAWINGS

The following detailed description when taken in conjunction with the figures presented herein present a complete description of the present invention.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The inventive method is preferably implemented as a software application which will integrate with the existing network management software packages and servers, such as Netview/6000, Hewlett-Packard OpenView, and others. The new software application implements the following general method or logic:

(a) When a router or a network device goes off-line, then it will send only one "network element or router down" event to the problem management server which does the correlation and issues the trouble tickets for alerting. Thus when the router down (network device) event is sent via a pager or email, the network operations personnel will know the router is down, and it is obvious that the devices connected downstream will be offline from the entire network;

(b) When a router NIC, port or interface goes off-line, the same logic should result in only one router down message being sent to the problem management server; and (c) When a networked element other than a router or NIC, such as a computer, goes off-line, it will send only one "computer down" event to the problem management server.

DETAILED DESCRIPTION OF THE INVENTION

The inventive method is preferably realized as a software application, called "Valerie", which integrates with existing network managment software packages and servers, such as Netview/6000, Hewlett-Packard OpenView, on common network server computer hardware platforms such as an IBM RS/6000.

Figure 1:
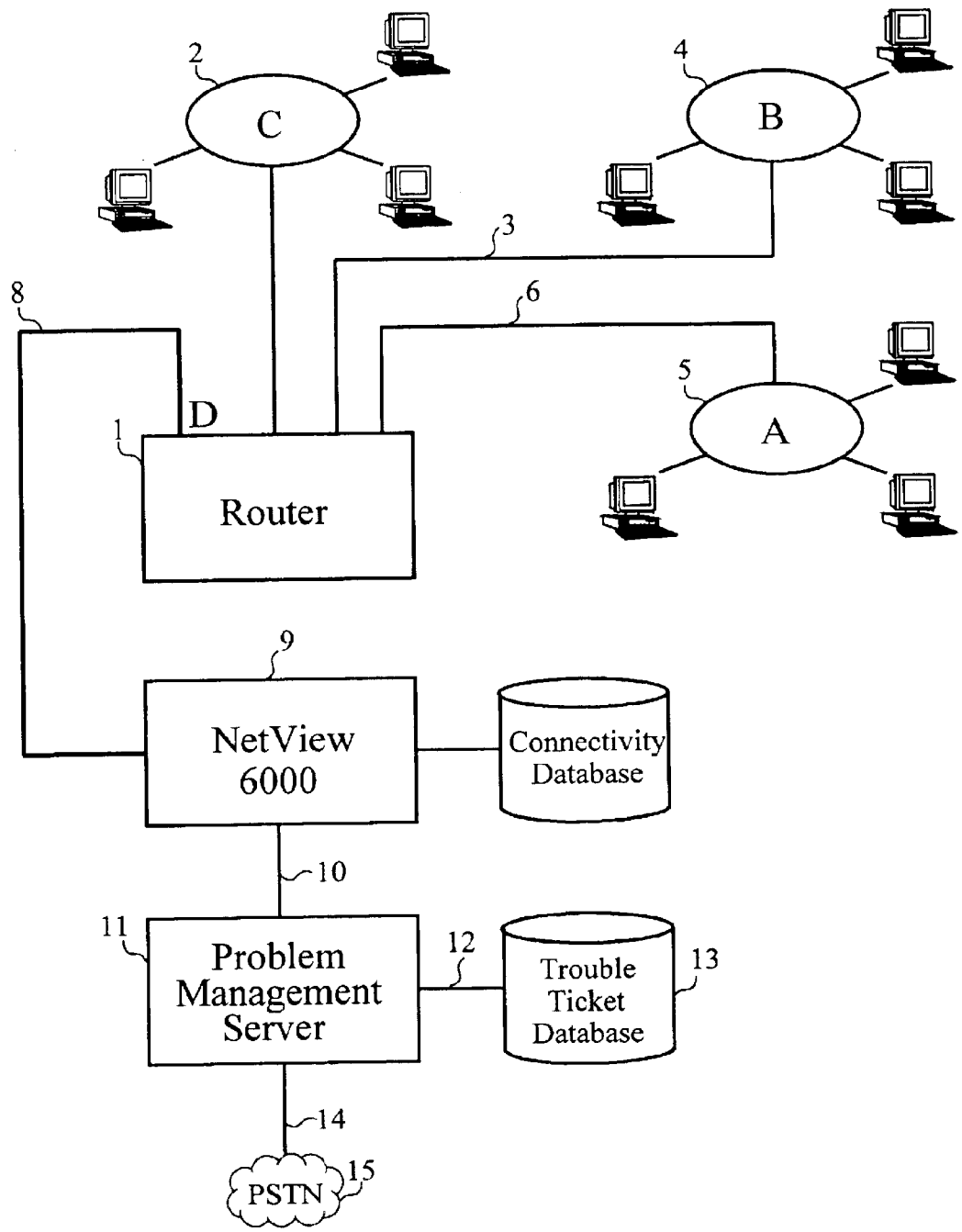
FIG. 1 shows the prior art topology for network management servers, software, and connectivity.
Figure 2:
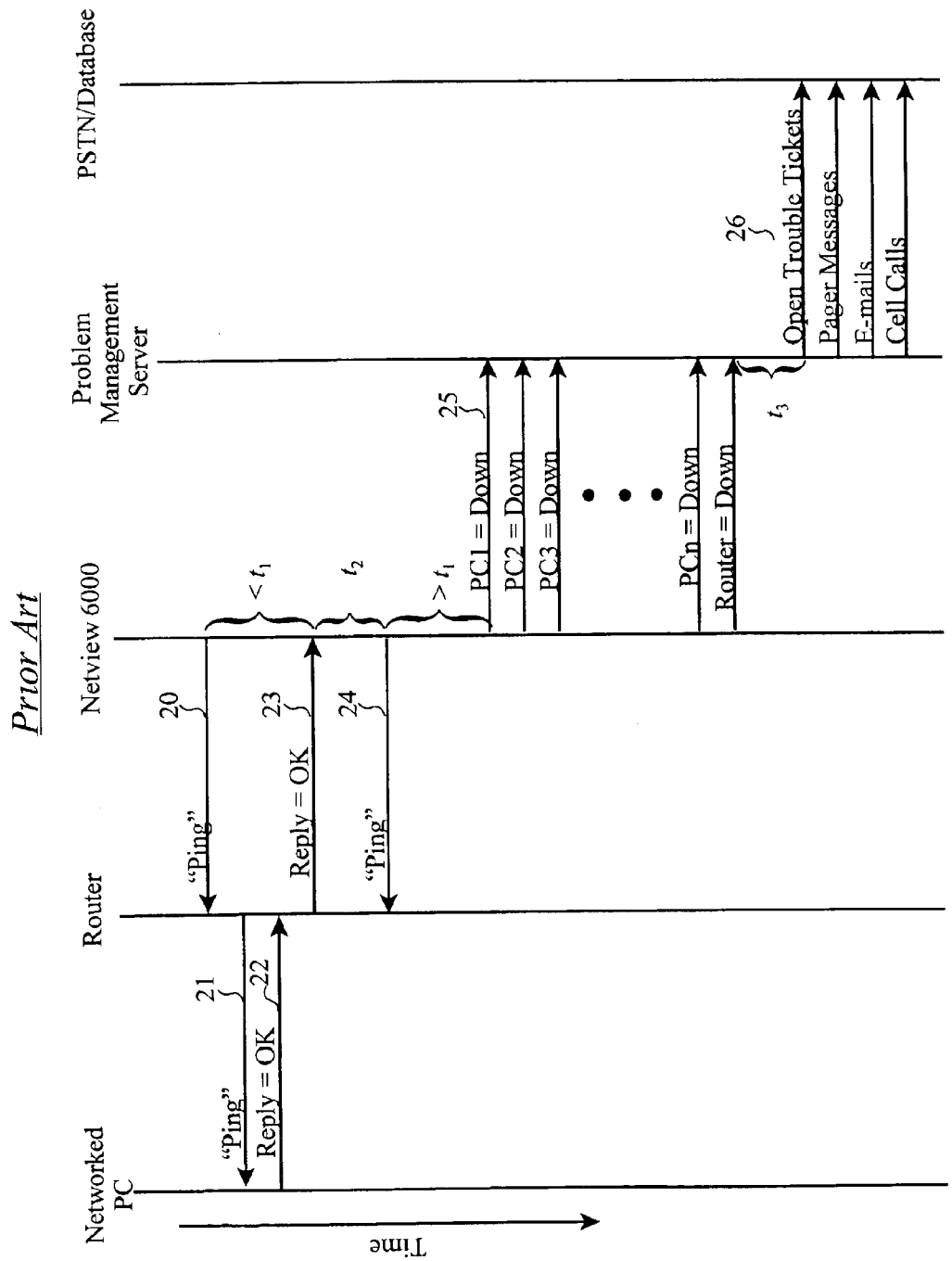
FIG. 2 discloses the message sequence used in prior art network management technology.
Figure 3:
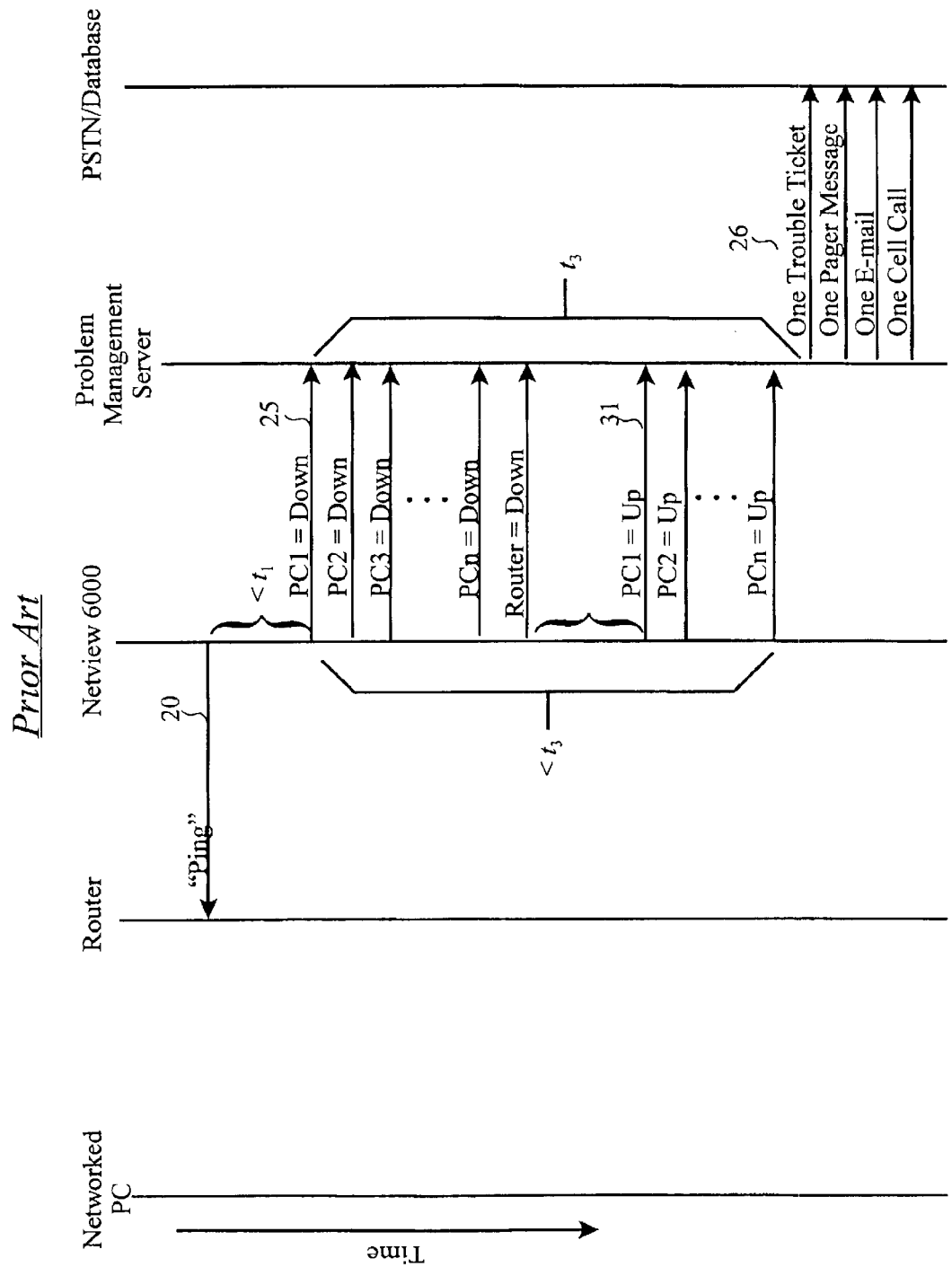
FIG. 3 discloses the enhanced prior art network management technology message sequence.

By the logic of the method, it is assumed that it is not likely that multiple failures occur on the same network simultaneously. An even if multiple failures are detected or indicated, certain patterns to the indications allow for diagnosis of a more likely single point of failure. For example, if all but one of the computers on network A in FIG. 1 are responding to "pings", it is more likely that the non-responsive computer is the failure point as the network wiring, router NIC, and router are still functioning for the other computers on network A. In fact, if even one computer on the network responds, it can be assumed that the network wiring, NMC and router are functioning correctly. However, if the pattern of non-responses includes all of the computers on a network, then the NIC and the router are suspect.

So, in the second step of the logic, if any computers on any other network connected to the router are responding, but all of the computers on just one network are not responding, it can be assumed to be a network wiring or NIC problem with the non-responding network. But, if no computers on any networks are responding, then the router can be assumed to be the single-point of failure.

In order to process the non-responses and the responses in this logical fashion, the Valerie application must have access to the connectivity database which describes the topology of the networks and computers interconnected by the router, and contains the addresses of the computers and other network elements. This database is already available from or through the network maintenance server, typically through a application program interface ("APP"). In the prefered embodiment, Valerie is a software application written in "C", and compiled and targeted for an RS/6000 computer platform running under the AIX operating system concurrently with NetView/6000. However, other languages, such as Java or C++, platforms, such as a Sun Server or IBM-compatible personal computer, and operating systems, such as Solaris or Microsoft Windows NT, may be used as the target system. In any case, the Valerie application program can access the connectivity database via an API through the NetView or OpenView application. Valerie can also send and receive messages using the platform's communication protocol stack, such as IP, and network interface cards, such as Ethernet interfaces, as well as monitor for messages on the network. The integration of Valerie into the overall network management technology is completed by disabling the "element down/element up" message output capability of the NetView or OpenView software, and by enabling the output of the Valerie logic results. Valerie's logic can be triggered by the results of the monitoring activity, or more actively by "trapping" the output event from the NetView or OpenView software.

Figure 4:
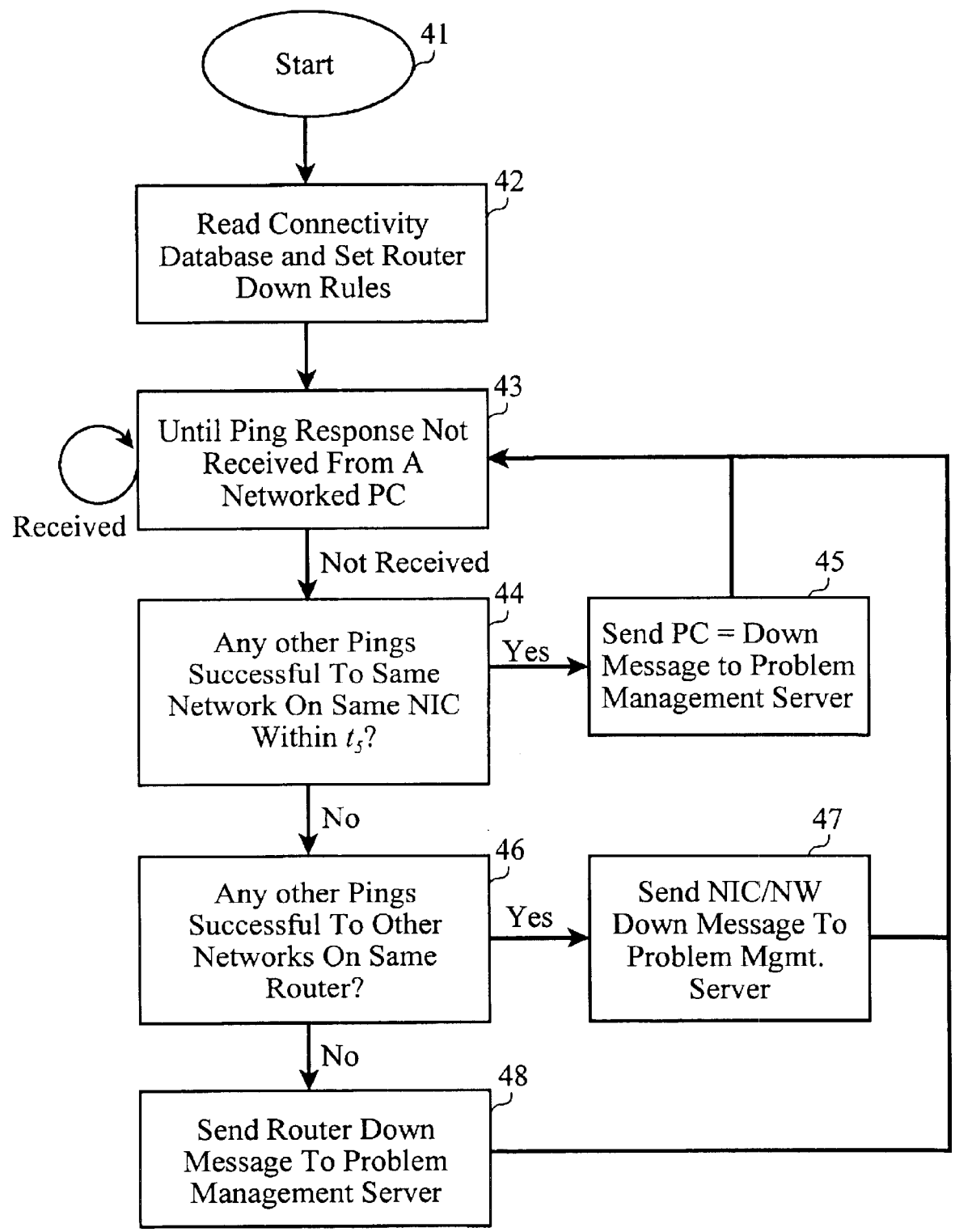
FIG. 4 illustrates the functional flow of the inventive method which filters and diagnosis the most likely point of failure in the network.
Figure 5:
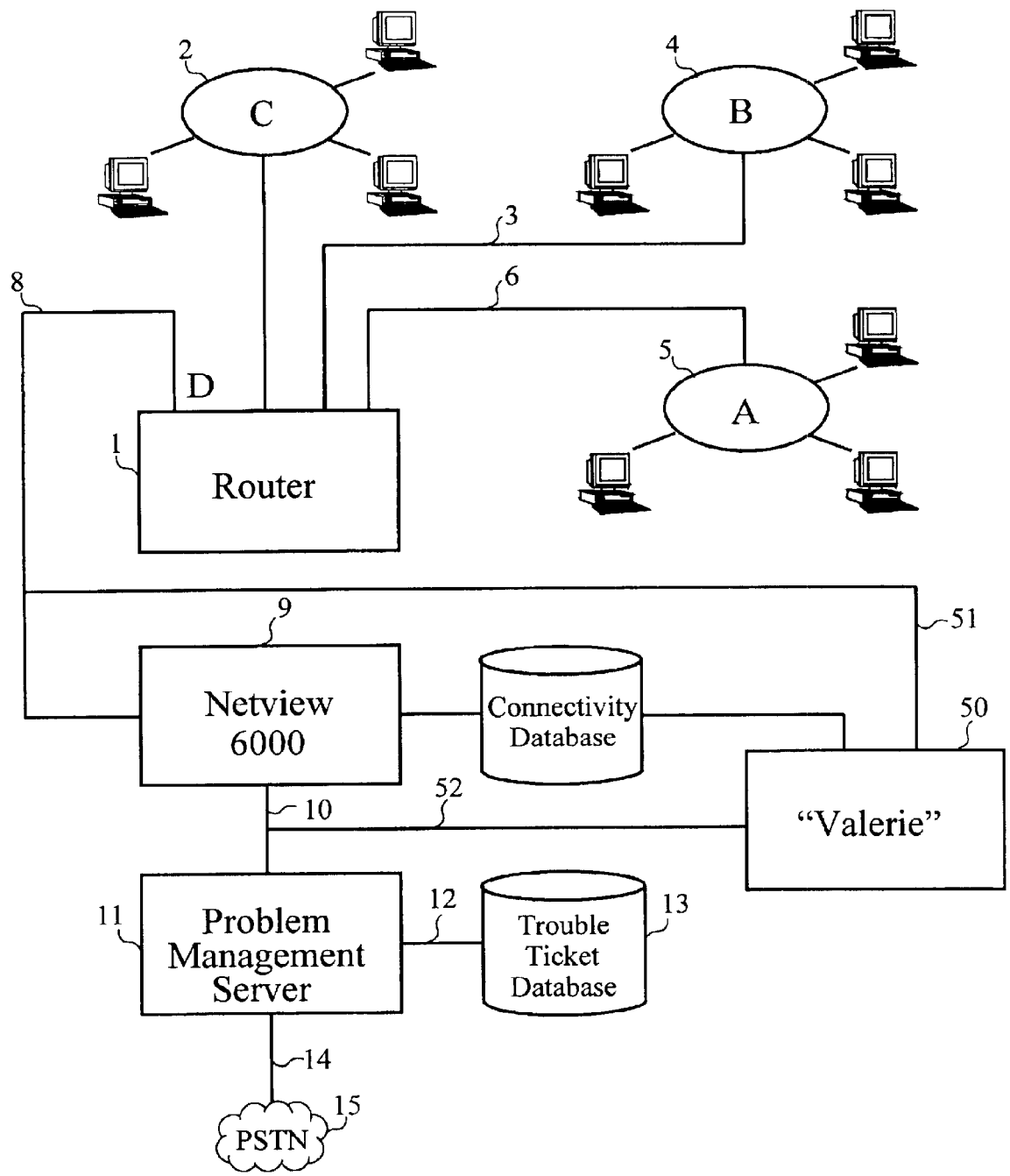
FIG. 5 shows the modified network topology to include a system which implements the inventive method.

FIG. 4 summarizes the logic of Valerie in a functional flow depiction. When Valerie is started (41), it reads the connectivity database and develops rules based on the network connectivity related to the router. Then, it periodically sends "ping" messages (43) to each element connected to the router. Alternatively, it may simply monitor the network for "pings" from the NetView application to each network element. These "pings" can be sent at any interval rate, but are sent at approximately 5 minute intervals in the preferred embodiment. Until a response is not received within a determined time limit, such as 5 minutes, the period "pings" continue. But when one or more responses are not received within the time limit, the logic processing begins. First, a recent history log is examined (44) to determine if any other computers on the same network or router NIC have been received. If so, then a single "element down" message for the non-responding element or computer is sent (45) to the problem management server.

If no other responses have been received recently from other elements or computers on the same network, then the history log is examined (46) to see if any other computers or elements on any other networks connected to the router have been received. If so, then the router NIC and/or network cabling for the the non-responsive network is assumed to be the point of failure, and a single "NIC or network down" message is sent (47) to the problem management server.

However, if no other elements or computers on any of the networks connected to the router have responded recently, then a single "router down" message is sent (48) to the problem management server.

In this embodiment of the invention, the history log can be built and updated by Valerie actively transmitting "pings" to network elements and registering the received responses. Or, it can be built passively by Valerie monitoring (or "snooping") the network for "pings" and responses between network elements and the network management software application (NetView/6000 or OpenView).

In an alternate embodiment of the invention, the history log is updated by quickly issuing new "pings" to all other network elements when a single response is not received within the time limit. This allows the fault deduction logic to operate on more recent data, giving a more accurate result.

Figure 6:
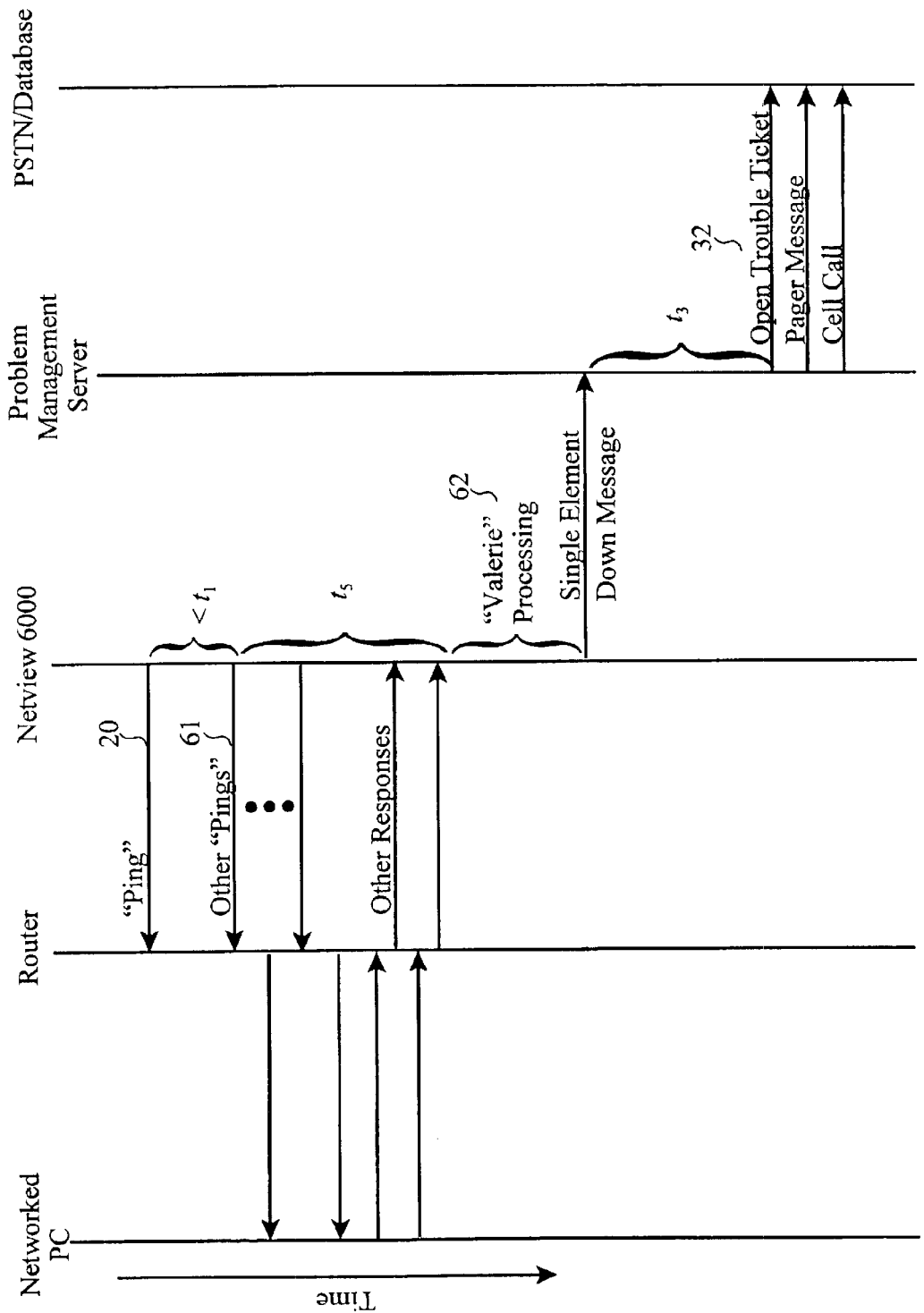
FIG. 6 shows the message sequence achieved by use of the inventive method, with substantially reduced network bandwidth requirements and increased accuracy of the alerts.

Finally, turning to FIG. 6, the reduced message bandwidth realized by the invention is noticable. Following the Valeria processing (62), a single "element down" message is sent to the problem management server by the enhanced maintenance server, shown here as NetView/6000 with Valerie.

It will be understood from the foregoing description that various modifications and changes may be made in the preferred embodiment of the present invention without departing from its true spirit, such as the use of alternate programming methodologies or languages, alternate server platforms, various networking protocols, operating systems and development tool sets. It is intended that this description is for purposes of illustration only and should not be construed in a limiting sense. The scope of this invention should be limited only by the language of the following claims.

What is claimed is:

1. A method of producing failure alerts in a computer network containing a plurality of networked elements including at least one network router, at least one network management server, and at least one problem management server, said router being interconnected to several subnetworks, each subnetwork interconnecting several networked elements, said method comprising the steps of:

monitoring transmissions via a computer network at least one status query message to each of said networked elements in said computer network;

initiating a timer for awaiting receipt of valid status responses from each networked element in reply to each status query message;

performing a fault tree analysis to determine the most likely single point of failure based upon a rule structure related to the topology of the computer network, said performance of fault tree analysis being invoked by expiration of the timer if less than all status responses are received;

transmitting via a computer network to said problem management server at least one element failed message for said determined single point of failure such that said problem management server is notified of the most likely point of failure;

receiving via a computer network one or more network element failed messages transmitted from said network management server;

selecting one network element failed message based upon results of said fault tree analysis; and forwarding said selected network element failed message to said problem management server via a computer network, thereby, blocking the forwarding of all other network element failed messages received from the network management server from being received by said problem management server.

2. A method of producing failure alerts in a computer network as set forth in claim 1 further comprising the steps of:

accessing a computer-readable media disposed in said network management server to obtain computer network connectivity and topology data; and initiating said rule structure based upon said accessed computer network connectivity and topological data.

3. A method of producing failure alerts in a computer network as set forth in claim 2, wherein the step of performing fault tree analysis further comprises the step of determining that a single element on a subnetwork is failed only if no response has been received from that single element and other responses have been received from other networked element on the same subnetwork within a predetermined amount of time.

4. A method of producing failure alerts in a computer network as set forth in claim 2, wherein the step of performing fault tree analysis further comprises the step of determining that a router interface, network interface card or port is failed only if no responses have been received from any of the networked elements on the subnetwork associated with that router interface, network interface card or port, and only if other responses have been received from other networked elements on other subnetworks associated with other router interfaces, network interface cards, and ports on the same router within a predetermined amount of time.

5. A method of producing failure alerts in a computer network as set forth in claim 2, wherein the step of performing fault tree analysis further comprises the step of determining that a router is failed only if no responses have been received from any networked elements on any subnetworks associated with any of the router's interfaces, network interface cards, and ports within a predetermined amount of time.

6. A method of producing failure alerts in a computer network as set forth in claim 1, further comprising the following steps after expiration of the timer and prior to performance of the fault tree analysis:

immediately retransmitting all status query messages to all networked elements upon the expiration of the timer; and re-initiating a timer for awaiting receipt of valid status responses from each networked element in reply to each retransmitted status query message, such that said step of performing fault tree analysis may be performed using a set of recently received responses from the networked elements.

7. A method of producing failure alerts in a computer network as set forth in claim 6, wherein said re-initiated timer is set for an expedited expiration, its expiration value being significantly shorter than the value of its normally initiated value.

8. A computer program product for use with network management server in a computer network, said computer network containing a plurality of networked elements including at least one network router, at least one network management server, and at least one problem management server, said router being interconnected to several subnetworks, each subnetwork interconnecting several networked elements, said computer program product comprising:

a computer usable medium having computer readable program code means embodied in said medium for monitoring transmissions via a computer network at least one status query message to each of said networked elements in said computer network;

a computer usable medium having computer readable program code means embodied in said medium for initiating a timer for awaiting receipt of valid status responses from each networked element in reply to each status query message;

a computer usable medium having computer readable program code means embodied in said medium for performing a fault tree analysis to determine the most likely single point of failure based upon a rule structure related to the topology of the computer network, said performance of adult tree analysis being invoked by expiration of the timer if less than all status responses are received a computer usable medium having computer readable program code means embodied in said medium for transmitting via a computer network to said problem management server at least one element failed message for said determined single point of failure such that said problem management server is notified of the most likely point of failure;

a computer usable medium having computer readable program code means embodied in said medium for receiving via a computer network one or more network element failed messages transmitted from said network management server;

a commuter usable medium having computer readable program code means embodied in said medium for selecting one network element failed message based upon results of said fault tree analysis; and a computer usable medium having computer readable program code means embodied in said medium for forwarding said selected network element failed message to said problem management server via a computer network, thereby blocking the forwarding of all other network element failed messages received from the network management server from being received by said problem management server.

9. A computer program product for use with network management server in a computer network as set forth in claim 8 further comprising:

a computer usable medium having computer readable program code means embodied in said medium for accessing a computer-readable media disposed in said network management server to obtain computer network connectivity and topology data; and a computer usable medium having computer readable program code means embodied in said medium for initiating said rule structure based upon said accessed computer network connectivity and topological data.

10. A computer program product for use with network management server in a computer network as set forth in claim 8 wherein the computer readable code for performing fault tree analysis further comprises computer readable program code means embodied in said medium for determining that a single element on a subnetwork is failed only if no response has been received from that single element and other responses have been received from other networked element on the same subnetwork within a predetermined amount of time.

11. A computer program product for use with network management server in a computer network as set forth in claim 8 wherein the computer readable code for performing fault tree analysis further comprises computer readable program code means embodied in said medium for determining that a router interface, network interface card or port is failed only if no responses have been received from any of the networked elements on the subnetwork associated with that router interface, network interface card or port, and only if other responses have been received from other networked elements on other subnetworks associated with other router interfaces, network interface cards, and ports on the same router within a predetermined amount of time.

12. A computer program product for use with network management server in a computer network as set forth in claim 8 wherein the computer readable code for performing fault tree analysis further comprises computer readable program code means embodied in said medium for determining that a router is failed only if no responses have been received from any networked elements on any subnetworks associated with any of the router's interfaces, network interface cards, and ports within a predetermined amount of time.

13. A computer program product for use with network management server in a computer network as set forth in claim 8, firer comprising:

a computer usable medium having computer readable program code means embodied in said medium for immediately retransmitting all status query messages to all networked elements upon the expiration of the timer; and a computer usable medium having computer readable program code means embodied in said medium for re-initiating a timer for awaiting receipt of valid status responses from each networked element in reply to each retransmitted status query message, such that said fault tree analysis may be performed using a set of recently received responses from the networked elements.

14. A network management server system for producing failure alerts in a computer network, said computer network having at least one network router interconnected to several subnetworks, a plurality of networked elements interconnected via said subnetworks and to said network routers, and at least one problem management server for escalation of failure alerts and notification of failures to maintenance personnel, said network management server system comprising:

a network server including a computer hardware platform with a processor and computer-readable medium for storing data and program code, a network communications protocol stack, a network management software suite, and at least one means for communication to networked elements, router and problem management server via said computer network;

a status monitor which monitors status replies from said networked elements made in response to status queries from said network management software suite;

a failure analyzer invoked by said network management software suite upon the failure to receive one or more status replies from said networked elements, said failure analyzer performing fault tree analysis to determine the most likely point of failure in the computer network;

a problem management server notifier which transmits a network element failed message to the problem management server via a computer network, said network element failed message including an indicator corresponding to said most likely point of failure as determined by the failure analyzer; and a message forwarder which receives via a computer network one or more network element failed messages transmitted from said network management server; selects one network element failed message based upon results of said fault tree analysis; and forwards said selected network element failed message to said problem management server via a computer network thereby blocking the forwarding of all other network element failed messages received from the network managment server from being received by said problem management server.

15. A network management server system for producing failure alerts in a computer network as set forth in claim 14, wherein said failure analyzer further comprises:

a set of rules for determining the most likely point of failure based upon a predetermined topological interrelationship between the networked elements, the subnetworks, and the routers and their interfaces to the subnetworks; and a comparator which applies the rules to a set of information containing all the status replies received from networked elements within a predetermined time period, said comparator producing an output corresponding to a most likely point of failure of the network.

16. A network management server system for producing failure alerts in a computer network as set forth in claim 15, wherein said set of rules comprise a rule that declares a networked element to be failed only if no status reply from the networked element is found in the set of information being analyzed by the analyzer, and only if at least one status reply from any other networked element on the same subnetwork is found in the set of information being analyzed by the analyzer.

17. A network management server system for producing failure alerts in a computer network as set forth in claim 15, wherein said set of rules comprise a rule that declares a suspect network router interface, network interface card, and port to be failed only if no status reply from any networked element on the subnetwork associated with the suspect network router interface, network interface card, and port is found in the set of information being analyzed by the analyzer, and only if at least one status reply from any other networked element on any other subnetwork associated with any other router interface, network interface card, and port on the same network router is found in the set of information being analyzed by the analyzer.

18. A network management server system for producing failure alerts in a computer network as set forth in claim 15, wherein said set of rules comprise a rule that declares a suspect network router to be failed only if no status reply from any networked element any subnetwork associated any network interface card or port associated with the suspect network is found in the set of information being analyzed by the analyzer.

19. A network management server system for producing failure alerts in a computer network as set forth in claim 14 further comprising a status refresher which immediately transmits a status query message to each networked element upon the invocation of the failure analyzer in order to update the set of replies received and allow analysis on more recent status of the network to be performed.

20. A network management server system for producing failure alerts in a computer network as set forth in claim 14 wherein said status monitor, fault analyzer and problem management server notifier are application programs interfaced to a standard network management server software suite.

21. A network management server system for producing failure alerts in a computer network as set forth in claim 20 wherein said application programs are "C" programs compiled and targeted for execution by said computer hardware platform.

22. A network management server system for producing failure alerts in a computer network as set forth in claim 20 wherein said standard network management server software suite is a NetView suite.

23. A network management server system for producing failure alerts in a computer network as set forth in claim 20 wherein said standard network management server software suite is an OpenView suite.

24. A network management server system for producing failure alerts in a computer network as set forth in claim 20 wherein said computer hardware platform is an RS/6000 computer platform running an AIX operating system, both of which are International Business Machines products.

* * * * *

UNITED STATES PATENT AND TRADEMARK OFFICE
CERTIFICATE OF CORRECTION

PATENT NO. : 6,813,634 B1
DATED : November 2, 2004
INVENTOR(S) : Mohammad Ahmed

It is certified that error appears in the above-identified patent and that said Letters Patent is hereby corrected as shown below:

<u>Column 4,</u>
Line 39, change "An" to -- And --.
Line 48, change "NMC" to -- NIC --.

<u>Column 8,</u>
Line 67, change "firer" to -- further --.

Signed and Sealed this

Sixteenth Day of August, 2005

JON W. DUDAS
*Director of the United States Patent and Trademark Office*